United States Patent
Liu et al.

(10) Patent No.: US 10,891,461 B2
(45) Date of Patent: Jan. 12, 2021

(54) LIVE FINGERPRINT DETECTION UTILIZING AN INTEGRATED ULTRASOUND AND INFRARED SENSOR

(71) Applicant: INVENSENSE, INC., San Jose, CA (US)

(72) Inventors: Fang Liu, San Jose, CA (US); Peter Hartwell, Menlo Park, CA (US); Martin Lim, San Mateo, CA (US)

(73) Assignee: INVENSENSE, INC., San Jose, CA (US)

( * ) Notice: Subject to any disclaimer, the term of this patent is extended or adjusted under 35 U.S.C. 154(b) by 73 days.

(21) Appl. No.: 15/601,934

(22) Filed: May 22, 2017

(65) Prior Publication Data

US 2018/0336390 A1    Nov. 22, 2018

(51) Int. Cl.
G06K 9/00 (2006.01)
G06K 9/20 (2006.01)
G06K 9/62 (2006.01)

(52) U.S. Cl.
CPC ......... *G06K 9/0012* (2013.01); *G06K 9/0002* (2013.01); *G06K 9/0004* (2013.01); *G06K 9/00107* (2013.01); *G06K 9/00906* (2013.01); *G06K 9/2018* (2013.01); *G06K 9/6293* (2013.01)

(58) Field of Classification Search
CPC ............... G06K 9/0002; G06K 9/6293; G06K 9/00006; G06K 9/00107; G06K 9/00906; G06K 9/2018; G06F 2203/04106; G02F 1/13338; H01L 41/1132; H01L 41/31; H01L 27/20
See application file for complete search history.

(56) References Cited

U.S. PATENT DOCUMENTS 5,575,286 A    11/1996    Weng et al.
5,684,243 A    11/1997    Gururaja et al.
(Continued)

FOREIGN PATENT DOCUMENTS

EP    1 214 909 A1    6/2002
EP    2 884 301 A1    6/2015
(Continued)

OTHER PUBLICATIONS

International Search Report dated Sep. 6, 2018 for PCT Application No. PCT/US2018/029352, 18 pages.
(Continued)

*Primary Examiner* — Kim Y Vu
*Assistant Examiner* — Michael J Vanchy, Jr.
(74) *Attorney, Agent, or Firm* — Amin, Turocy & Watson, LLP

(57) ABSTRACT

Facilitating live fingerprint detection utilizing an integrated ultrasound and infrared (IR) sensor is presented herein. A fingerprint sensor can comprise a first substrate comprising the IR sensor, and a second substrate comprising an ultrasonic transducer. The second substrate is attached to a top portion of the first substrate, and a temperature output of the IR sensor facilitates a determination that a fingerprint output of the ultrasonic transducer corresponds to a finger. The IR sensor can comprise polysilicon comprising a thermopile and an array of photonic crystals thermally coupled to the thermopile.

28 Claims, 10 Drawing Sheets

(56) References Cited

U.S. PATENT DOCUMENTS

| | | | |
|---|---|---|---|
| 5,808,967 | A | 9/1998 | Yu et al. |
| 5,867,302 | A | 2/1999 | Fleming |
| 6,071,239 | A | 6/2000 | Cribbs et al. |
| 6,289,112 | B1 | 9/2001 | Jain et al. |
| 6,350,652 | B1 | 2/2002 | Libera et al. |
| 6,428,477 | B1 | 8/2002 | Mason |
| 6,500,120 | B1 | 12/2002 | Anthony |
| 6,676,602 | B1 | 1/2004 | Barnes et al. |
| 6,736,779 | B1 | 5/2004 | Sano et al. |
| 7,067,962 | B2 | 6/2006 | Scott |
| 7,109,642 | B2 | 9/2006 | Scott |
| 7,243,547 | B2 | 7/2007 | Cobianu et al. |
| 7,400,750 | B2 | 7/2008 | Nam |
| 7,459,836 | B2 | 12/2008 | Scott |
| 7,471,034 | B2 | 12/2008 | Schlote-Holubek et al. |
| 7,489,066 | B2 | 2/2009 | Scott et al. |
| 7,739,912 | B2 | 6/2010 | Schneider et al. |
| 8,018,010 | B2 | 9/2011 | Tigli et al. |
| 8,139,827 | B2 | 3/2012 | Schneider et al. |
| 8,311,514 | B2 | 11/2012 | Bandyopadhay et al. |
| 8,335,356 | B2 | 12/2012 | Schmitt |
| 8,433,110 | B2 | 4/2013 | Kropp et al. |
| 8,508,103 | B2 | 8/2013 | Schmitt et al. |
| 8,515,135 | B2 | 8/2013 | Clarke et al. |
| 8,666,126 | B2 | 3/2014 | Lee et al. |
| 8,703,040 | B2 | 4/2014 | Liufu et al. |
| 8,723,399 | B2 | 5/2014 | Sammoura et al. |
| 8,805,031 | B2 | 8/2014 | Schmitt |
| 9,056,082 | B2 | 6/2015 | Liautaud et al. |
| 9,070,861 | B2 | 6/2015 | Bibl et al. |
| 9,224,030 | B2 | 12/2015 | Du et al. |
| 9,245,165 | B2 | 1/2016 | Slaby et al. |
| 9,424,456 | B1 | 8/2016 | Kamath Koteshwara et al. |
| 9,572,549 | B2 | 2/2017 | Belevich et al. |
| 9,582,102 | B2 | 2/2017 | Setlak |
| 9,607,203 | B1 | 3/2017 | Yazdandoost et al. |
| 9,607,206 | B2 | 3/2017 | Schmitt et al. |
| 9,613,246 | B1 | 4/2017 | Gozzini et al. |
| 9,665,763 | B2 | 5/2017 | Du et al. |
| 9,747,488 | B2 | 8/2017 | Yazdandoost et al. |
| 9,785,819 | B1 | 10/2017 | Oreifej |
| 9,815,087 | B2 | 11/2017 | Ganti et al. |
| 9,817,108 | B2 | 11/2017 | Kuo et al. |
| 9,818,020 | B2 | 11/2017 | Schuckers et al. |
| 9,881,195 | B2 | 1/2018 | Lee et al. |
| 9,881,198 | B2 | 1/2018 | Lee et al. |
| 9,898,640 | B2 | 2/2018 | Ghavanini |
| 9,904,836 | B2 | 2/2018 | Yeke Yazdandoost et al. |
| 9,909,225 | B2 | 3/2018 | Lee et al. |
| 9,922,235 | B2 | 3/2018 | Cho et al. |
| 9,934,371 | B2 | 4/2018 | Hong et al. |
| 9,939,972 | B2 | 4/2018 | Shepelev et al. |
| 9,953,205 | B1* | 4/2018 | Rasmussen ............ G06K 9/0002 |
| 9,959,444 | B2 | 5/2018 | Young et al. |
| 9,967,100 | B2 | 5/2018 | Hong et al. |
| 9,983,656 | B2 | 5/2018 | Merrell et al. |
| 9,984,271 | B1 | 5/2018 | King et al. |
| 10,275,638 | B1 | 4/2019 | Yousefpor et al. |
| 10,408,797 | B2 | 9/2019 | Apte et al. |
| 2002/0135273 | A1 | 9/2002 | Mauchamp et al. |
| 2003/0013955 | A1 | 1/2003 | Poland |
| 2003/0148620 | A1* | 8/2003 | Chavan ................. B81B 3/0072 438/706 |
| 2003/0215974 | A1* | 11/2003 | Kawasaki ........... B81C 1/00047 438/50 |
| 2004/0085858 | A1 | 5/2004 | Khuri-Yakub et al. |
| 2004/0122316 | A1 | 6/2004 | Satoh et al. |
| 2004/0174773 | A1 | 9/2004 | Thomenius et al. |
| 2005/0057284 | A1 | 3/2005 | Wodnicki |
| 2005/0110071 | A1 | 5/2005 | Ema et al. |
| 2005/0145964 | A1* | 7/2005 | Suzuki ............. H01L 31/02327 257/432 |
| 2005/0146240 | A1 | 7/2005 | Smith et al. |
| 2005/0148132 | A1 | 7/2005 | Wodnicki et al. |
| 2005/0162040 | A1 | 7/2005 | Robert |
| 2006/0052697 | A1 | 3/2006 | Hossack et al. |
| 2006/0079777 | A1 | 4/2006 | Karasawa |
| 2007/0046396 | A1 | 3/2007 | Huang |
| 2007/0073135 | A1 | 3/2007 | Lee et al. |
| 2007/0202252 | A1 | 8/2007 | Sasaki |
| 2007/0215964 | A1 | 9/2007 | Khuri-Yakub et al. |
| 2007/0230754 | A1 | 10/2007 | Jain et al. |
| 2008/0125660 | A1 | 5/2008 | Yao et al. |
| 2008/0150032 | A1 | 6/2008 | Tanaka |
| 2008/0194053 | A1 | 8/2008 | Huang |
| 2009/0005684 | A1 | 1/2009 | Kristoffersen et al. |
| 2009/0128714 | A1* | 5/2009 | Taya ..................... G08C 17/00 348/734 |
| 2009/0182237 | A1 | 7/2009 | Angelsen et al. |
| 2009/0274343 | A1 | 11/2009 | Clarke |
| 2009/0303838 | A1 | 12/2009 | Svet |
| 2010/0030076 | A1 | 2/2010 | Vortman et al. |
| 2010/0168583 | A1 | 7/2010 | Dausch et al. |
| 2010/0195851 | A1 | 8/2010 | Buccafusca |
| 2010/0201222 | A1 | 8/2010 | Adachi et al. |
| 2010/0202254 | A1 | 8/2010 | Roest et al. |
| 2010/0213373 | A1* | 8/2010 | Meinel ..................... G01J 5/12 250/338.4 |
| 2010/0239751 | A1 | 9/2010 | Regniere |
| 2010/0251824 | A1 | 10/2010 | Schneider et al. |
| 2010/0256498 | A1 | 10/2010 | Tanaka |
| 2010/0278008 | A1 | 11/2010 | Ammar |
| 2011/0285244 | A1 | 11/2011 | Lewis et al. |
| 2011/0291207 | A1 | 12/2011 | Martin et al. |
| 2012/0016604 | A1 | 1/2012 | Irving et al. |
| 2012/0092026 | A1 | 4/2012 | Liautaud et al. |
| 2012/0095347 | A1 | 4/2012 | Adam et al. |
| 2012/0147698 | A1 | 6/2012 | Wong et al. |
| 2012/0232396 | A1 | 9/2012 | Tanabe |
| 2012/0238873 | A1 | 9/2012 | Lacoste et al. |
| 2012/0238876 | A1 | 9/2012 | Tanabe et al. |
| 2012/0279865 | A1 | 11/2012 | Regniere et al. |
| 2012/0288641 | A1 | 11/2012 | Diatezua et al. |
| 2013/0051179 | A1 | 2/2013 | Hong |
| 2013/0064043 | A1 | 3/2013 | Degertekin et al. |
| 2013/0127592 | A1 | 5/2013 | Fyke et al. |
| 2013/0133428 | A1 | 5/2013 | Lee et al. |
| 2013/0201134 | A1 | 8/2013 | Schneider et al. |
| 2013/0294202 | A1 | 11/2013 | Hajati |
| 2014/0060196 | A1 | 3/2014 | Falter et al. |
| 2014/0117812 | A1 | 5/2014 | Hajati |
| 2014/0176332 | A1 | 6/2014 | Alameh et al. |
| 2014/0208853 | A1 | 7/2014 | Onishi |
| 2014/0219521 | A1 | 8/2014 | Schmitt et al. |
| 2014/0232241 | A1 | 8/2014 | Hajati |
| 2014/0265721 | A1 | 9/2014 | Robinson et al. |
| 2014/0355387 | A1 | 12/2014 | Kitchens et al. |
| 2015/0036065 | A1 | 2/2015 | Yousefpor et al. |
| 2015/0087991 | A1 | 3/2015 | Chen et al. |
| 2015/0097468 | A1 | 4/2015 | Hajati et al. |
| 2015/0145374 | A1 | 5/2015 | Xu et al. |
| 2015/0164473 | A1 | 6/2015 | Kim et al. |
| 2015/0165479 | A1 | 6/2015 | Lasiter et al. |
| 2015/0169136 | A1 | 6/2015 | Ganti et al. |
| 2015/0189136 | A1 | 7/2015 | Chung et al. |
| 2015/0198699 | A1 | 7/2015 | Kuo et al. |
| 2015/0206738 | A1 | 7/2015 | Rastegar |
| 2015/0213180 | A1 | 7/2015 | Herberholz |
| 2015/0220767 | A1 | 8/2015 | Yoon et al. |
| 2015/0261261 | A1 | 9/2015 | Bhagavatula et al. |
| 2015/0286312 | A1 | 10/2015 | Kang et al. |
| 2015/0345987 | A1 | 12/2015 | Hajati |
| 2015/0357375 | A1* | 12/2015 | Tsai ...................... H01L 27/20 257/416 |
| 2016/0051225 | A1 | 2/2016 | Kim et al. |
| 2016/0063294 | A1 | 3/2016 | Du et al. |
| 2016/0086010 | A1 | 3/2016 | Merrell et al. |
| 2016/0092716 | A1 | 3/2016 | Yazdandoost et al. |
| 2016/0100822 | A1 | 4/2016 | Kim et al. |
| 2016/0107194 | A1 | 4/2016 | Panchawagh et al. |
| 2016/0326477 | A1 | 11/2016 | Fernandez-Alcon et al. |
| 2017/0075700 | A1 | 3/2017 | Abudi et al. |
| 2017/0100091 | A1 | 4/2017 | Eigil et al. |
| 2017/0110504 | A1 | 4/2017 | Panchawagh et al. |

(56) References Cited

U.S. PATENT DOCUMENTS

| | | | |
|---|---|---|---|
| 2017/0119343 A1 | 5/2017 | Pintoffl |
| 2017/0168543 A1 | 6/2017 | Dai et al. |
| 2017/0219536 A1 | 8/2017 | Koch et al. |
| 2017/0231534 A1 | 8/2017 | Agassy et al. |
| 2017/0293791 A1 | 10/2017 | Mainguet et al. |
| 2017/0322290 A1 | 11/2017 | Ng et al. |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328870 A1 | 11/2017 | Garlepp et al. |
| 2017/0330012 A1 | 11/2017 | Salvia et al. |
| 2017/0330552 A1 | 11/2017 | Garlepp et al. |
| 2017/0330553 A1 | 11/2017 | Garlepp et al. |
| 2017/0357839 A1 | 12/2017 | Yazdandoost et al. |
| 2018/0206820 A1 | 7/2018 | Anand et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2019/0102046 A1 | 4/2019 | Miranto et al. |

FOREIGN PATENT DOCUMENTS

| | | |
|---|---|---|
| JP | 2011-040467 A | 2/2011 |
| KR | 101700998 B1 | 1/2017 |
| WO | 2009/096576 A2 | 8/2009 |
| WO | 2009/137106 A2 | 11/2009 |
| WO | 2014/035564 A1 | 3/2014 |
| WO | 2015/009635 A1 | 1/2015 |
| WO | 2015/112453 A1 | 7/2015 |
| WO | 2015/120132 A1 | 8/2015 |
| WO | 2015/131083 A1 | 9/2015 |
| WO | 2015/183945 A1 | 12/2015 |
| WO | 2016/007250 A1 | 1/2016 |
| WO | 2016/011172 A1 | 1/2016 |
| WO | 2016/040333 A2 | 3/2016 |
| WO | 2017/003848 A1 | 1/2017 |
| WO | 2017/192895 A1 | 11/2017 |
| WO | 2017/192903 A3 | 11/2017 |
| WO | 2017/196678 A1 | 11/2017 |
| WO | 2017/196682 A1 | 11/2017 |

OTHER PUBLICATIONS

Smith, Steven W. "Moving Average Fillers", The Scientist & Engineer's Guide to Digital Signal Processing, Chapter 15, 1999, 8 pages.

"Receiver Thermal Noise Threshold", Fisher Telecommunication Services, Satellite Communications. [http//www.fishercom.xyz:80/satellite-communications/receiverthermal-noise-threshold.html] Last updated Jan. 13, 2020, retrieved on Mar. 29, 2020, 3 pages.

"ZTE Blade V7 Max" ZTE Devices, [https://ztedevices.com.my/index.php/2016/09/01/blade-v7-max/], Sep. 1, 2016, retrieved on Mar. 29, 2020, 7 pages.

International Preliminary Report on Patentability dated Nov. 26, 2019 for PCT Application No. PCT/US2018/029352, 11 pages.

Non-Final Office Action received for U.S. Appl. No. 15/424,720 dated Jan. 9, 2019, 32 pages.

International Search Report and Written Opinion received for PCT Application Serial No. PCT/US2017/031140 dated Nov. 2, 2017, 16 pages.

International Search Report and Written Opinion received for PCT Application Serial No. PCT/US2017/031826 dated Feb. 28, 2018, 16 pages.

Tang, et al., "Pulse-Echo Ultrasonic Fingerprint Sensor on a Chip", IEEE Transducers, Anchorage, Alaska, USA, Jun. 21-25, 2015, pp. 674-677.

Dausch, et al., "Theory and Operation of 2-D Array Piezoelectric Micromachined Ultrasound Transducers", IEEE rransactions on Ultrasonics, and Frequency Control, vol. 55, No. 11 ;, Nov. 2008, 2484-2492.

Hopcroft, et al., "Temperature Compensation of a MEMS Resonator Using Quality Factor as a Thermometer", Retrieved from Internet: http://micromachine_stanford_edu/-amanu/linked/MAH_MEMS2006.pdf, 2006, 222-225.

Hopcroft, et al., "Using the temperature dependence of resonator quality factor as a thermometer", Applied Physics Letters 91 _ Retrieved from Internet: http://micromachine.stanford.edu/-hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP advances 5. 12. Retrieved from Internet: http://scitation_aip.org/content/aip/journal/adva/5/12/10.1063/1.4939217, 2015, 127231.

Qie et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et aL, "Anisotropic Complementary Acoustic Metamaterial for Canceling out Aberrating Layers", American Physical Society, Physical Review X 4-4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http:J/blog_narotama_ac_id/wp-content/uploads/2014/12/Multiresonator-approach-to-eliminating-the-temperature-dependance-of-silicon-based-timing-references_pdf, 2014, 415-418.

ISA/EP, International Search Report and Written Opinion for International Application No. PCT/US2017/031120, 10 pages, dated Aug. 29, 2017 (Aug. 29, 2017).

ISA/EP, International Search Report and Written Opinion for International Application No. PCT/US2017/031134, 10 Pages, dated Aug. 30, 2017 (Aug. 30, 2017).

ISA/EP, International Search Report and Written Opinion for International Application No. PCT/US2017/031421, 11 Pages, dated Jun. 21, 2017 (Jun. 21, 2017).

ISA/EP, International Search Report and Written Opinion for International Application No. PCT/US2017/031426 11 pages, dated Jun. 22, 2017 (Jun. 22, 2017).

ISA/EP, International Search Report and Written Opinion for International Application No. PCT/US2017/031431, 12 Pages, dated Aug. 1, 2017 (Aug. 1, 2017).

ISA/EP, International Search Report and Written Opinion for International Application No. PCT/US2017/031434, 11 Pages, dated Jun. 26, 2017 (Jun. 26, 2017).

ISA/EP, International Search Report and Written Opinion for International Application No. PCT/US2017/031439, 8 pages, dated Jun. 20, 2017 (Jun. 20, 2017).

ISA/EP, International Search Report and Written Opinion for International Application No. PCT/US2017/031824, 16 pages, dated Sep. 22, 2017 (Sep. 22, 2017).

ISA/EP, International Search Report and Written Opinion for International Application No. PCT/US2017/031827, 14 Pages, dated Aug. 1, 2017 (Aug. 1, 2017).

ISA/EP, International Search Report and Written Opinion for International Application No. PCT/US2017/031831, 10 Pages, dated Jul. 21, 2017 (Jul. 21, 2017).

International Search Report and Written Opinion received for PCT Application Serial No. PCTUS2017031823 dated Aug. 17, 2017, 10 pages.

Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.

(56) References Cited

OTHER PUBLICATIONS

Zhou, et al., "Partial Fingerprint Reconstruction with Improved Smooth Extension", Network and System Security, Springer Berlin Heidelberg, Jun. 3, 2013, 756-762.
"ISA/EP, International Search Report and Written Opinion for International Application# PCT/US2018/063431, 14 pages, dated Feb. 5, 2019 (Feb. 5, 2019)".
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
"Sleep Mode", Wikipedia, Retrieved from the Internet: URL:https://web.archive.org/web/20170908153323/https://en.Wikipedia.org/wiki/Sleep mode[retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
"ISA/EP, International Search Report and Written Opinion for International Application# PCT/US2019/015020, 13 pages, dated Jul. 1, 2019 (Jul. 1, 2019)".
"ISA/EP, International Search Report and Written Opinion for International Application# PCT/US2019/023440, 9 pages, dated Jun. 4, 2019 (Jun. 4, 2019)".
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.

\* cited by examiner

LIVE FINGERPRINT DETECTION UTILIZING AN INTEGRATED ULTRASOUND AND INFRARED SENSOR

TECHNICAL FIELD

The subject disclosure generally relates to embodiments for facilitating live fingerprint detection utilizing an integrated ultrasound and infrared (IR) sensor.

BACKGROUND

Conventional fingerprint technologies are susceptible to fraudulent authentication when an image of a finger, a fingerprint replication medium, etc. has been presented to a sensor instead of a real finger. In this regard, conventional fingerprint technologies, e.g., capacitive finger print technologies, ultrasonic finger print technologies, etc. have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
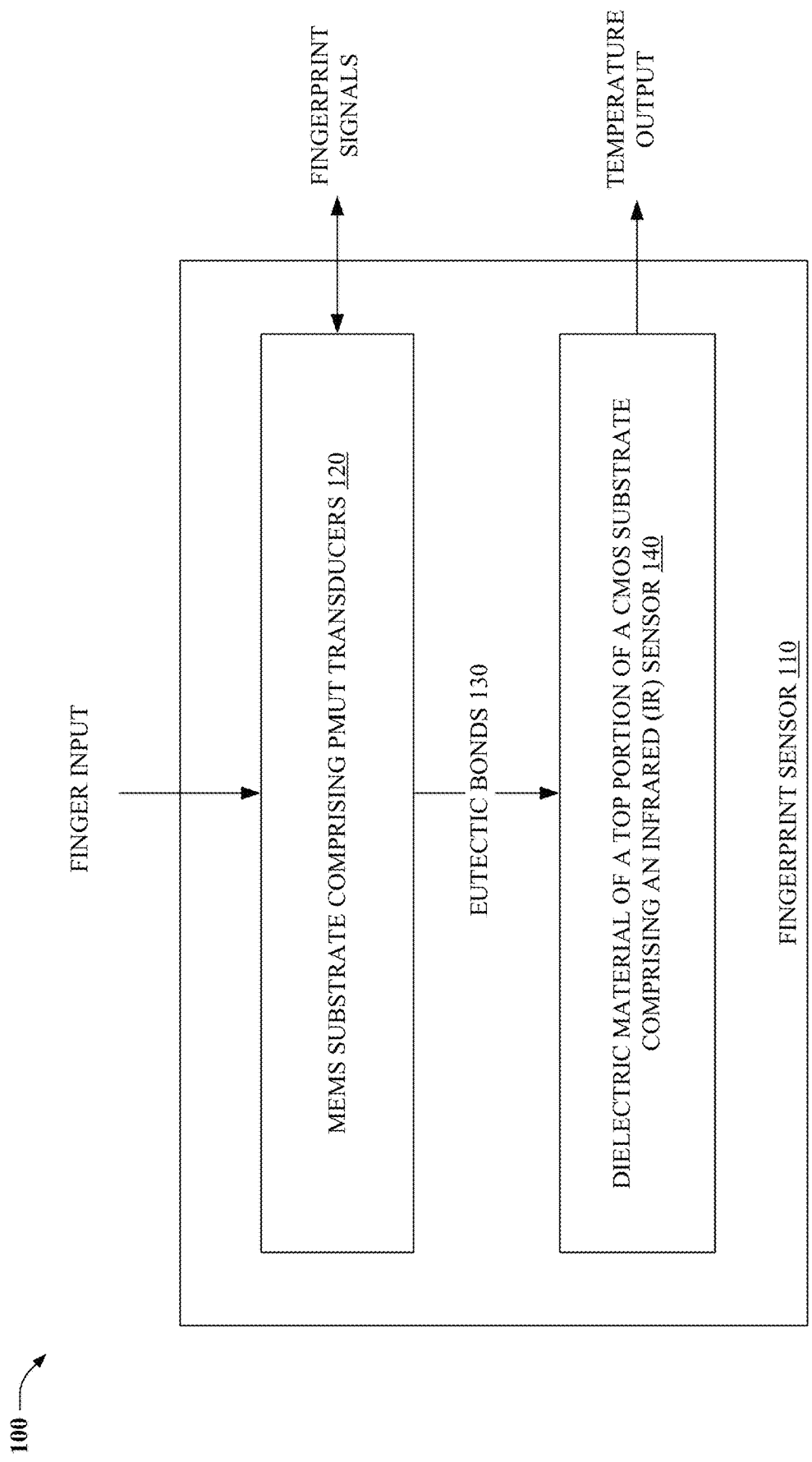
FIG. 1 illustrates a block diagram of a fingerprint sensor utilizing an integrated ultrasound and IR sensor, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, convention fingerprint technologies have had some drawbacks with respect to being susceptible to fraudulent authentication. Various embodiments disclosed herein can improve fingerprint detection by utilizing an integrated ultrasound and CMOS-based IR sensor to perform temperature based authentication of a fingerprint.

For example, a device, e.g., a fingerprint sensor, etc. can comprise a first substrate, e.g., CMOS substrate, comprising an IR sensor, and a second substrate, e.g., a micro-electro-mechanical system (MEMS) substrate, comprising an ultrasonic transducer, e.g., a piezoelectric micromachined ultrasonic transducer (PMUT)—the MEMS substrate attached to a top portion of the CMOS substrate, e.g., using fusion bonds, eutectic bonds, etc.

In an embodiment, a temperature output of the IR sensor can facilitate a determination that a fingerprint output of the ultrasonic transducer corresponds to a finger being applied to the device, fingerprint sensor, etc.

In one embodiment, the IR sensor comprises a polysilicon-based thermocouple comprising a p-type polysilicon gate material in conjunction with an n-type polysilicon gate material. In another embodiment, the IR sensor can comprise multiple polysilicon-based thermocouples that can be arranged to form a thermopile to increase a strength of an output, e.g., voltage output, of the IR sensor, representing a temperature of the IR sensor.

In an embodiment, the IR sensor comprises an array of photonic crystals that are thermally coupled to the p-type polysilicon gate material and the n-type polysilicon gate material. In this regard, the array of photonic crystals comprises a geometric formation of a material that is designed to absorb desired wavelength(s) of radiation to enhance detection of incoming IR thermal radiation.

In one embodiment, the polysilicon-based thermocouple is formed above a chamber of the first substrate. In another embodiment, a top portion of the IR sensor, e.g., opposite the chamber, and a bottom portion of the IR sensor, e.g., adjacent to the chamber, comprise a vacuum.

In yet another embodiment, a method, e.g., of manufacture of a device, e.g., comprising a fingerprint sensor, can comprise forming an IR sensor on a CMOS substrate, e.g., in a dielectric material of a top portion of the CMOS substrate; forming an ultrasonic transducer on a MEMS substrate; positioning the MEMS substrate above the CMOS substrate; and attaching the MEMS substrate to the CMOS substrate, e.g., using fusion bonds, eutectic bonds, etc. In embodiment(s), such bonds can be performed, e.g., during manufacturing, at a wafer level, a device level, etc.

In an embodiment, the forming of the IR sensor comprises forming a thermocouple in the dielectric material. In one embodiment, a first material of the thermocouple is formed from polysilicon. Further, a second material of the thermocouple is formed from a metal (e.g., aluminum (Al), polysilicon with a doping that is opposite from another doping of the first material, etc. In this regard, in an embodiment, the first material can directly contact the second material, e.g., forming a junction at such contact. In another embodiment, the first material can be connected to the second material utilizing a conductive material, e.g., metal, etc.

In other embodiment(s), multiple combinations, pairs, etc. of materials found readily in CMOS process(es) can be used to form the thermocouple, e.g., the first material comprising p-poly and the second material comprising n-poly, the first material comprising p-poly and the second material comprising n-poly, the first/second material comprising p-poly and the second/first material comprising a metal (e.g., Al), the first/second material comprising n-poly and the second/first material comprising the metal, etc.

In one embodiment, a first output of the thermocouple can be formed via a p-type polysilicon gate material, and a second output of the thermocouple can be formed via an n-type polysilicon gate material—the p-type polysilicon gate material and the n-type polysilicon forming a junction. In an embodiment, a magnitude of a voltage caused by a Seebeck effect corresponding to the junction is greatest, e.g., compared with Seebeck effects corresponding to a p-poly/metal junction or an n-poly/metal junction.

In other embodiment(s), other CMOS silicon material(s), e.g., an n+ diffusion layer and a p+ diffusion layer, can be used to form the thermocouple. In this regard, one advantage of utilizing such diffused materials of a CMOS substrate is that corresponding portions of the IR sensor can be thermally isolated, or suspended, from other components, structures, etc. of the CMOS substrate.

In one embodiment, the forming of the thermocouple comprises forming the thermocouple above a chamber of the CMOS substrate. In another embodiment the method further comprises creating a vacuum in the chamber.

In another embodiment, the forming of the IR sensor comprises forming an array of photonic crystals in the dielectric material.

In another embodiment, a system can comprise a fingerprint sensor comprising an IR sensor of a CMOS substrate, and an ultrasonic transducer of a MEMS substrate—the MEMS substrate attached above the CMOS substrate using fusion bonding, eutectic bonding, etc. Further, the system can comprise a processing component configured to determine, based on an output of the IR sensor, whether the ultrasonic transducer has been contacted by a finger.

In an embodiment, the IR sensor comprises polysilicon comprising a thermopile. In this regard, the thermopile comprises thermocouples within a dielectric material of a top portion of the CMOS substrate. In one embodiment, an output of the IR sensor comprises a first portion of the polysilicon comprising a p-type gate polysilicon layer, and a second portion of the polysilicon comprising an n-type gate polysilicon layer.

In one embodiment, the IR sensor comprises an array of photonic crystals within the dielectric material. In another embodiment, the IR sensor is placed above a chamber of the CMOS substrate. In yet another embodiment, the chamber comprises a vacuum.

In an embodiment, a method can comprise obtaining, by a system comprising a processor, a fingerprint output of a fingerprint sensor—the fingerprint sensor comprising a MEMS substrate comprising an ultrasonic transducer, e.g., comprising an array of piezoelectric micromachined ultrasonic transducers (PMUTs), which has been bonded, e.g., using eutectic bonding, to a CMOS substrate comprising an IR sensor; obtaining, by the system, a temperature output of the IR sensor representing a temperature of the fingerprint sensor; and determining, by the system based on the temperature output, whether the fingerprint output represents that the fingerprint sensor has been touched by a finger.

In one embodiment, the IR sensor comprises a polysilicon-based thermopile comprising thermocouples, and an array of photonic crystals thermally coupled to the thermocouples. In this regard, a first output of the IR sensor corresponds to a p-type polysilicon gate material, a second output of the IR sensor corresponds to an n-type polysilicon gate material, and the p-type polysilicon gate material and the n-type polysilicon gate material are thermally coupled to the array of photonic crystals. Further, the obtaining of the temperature output comprises obtaining the temperature output via the first output and the second output.

In another embodiment, the determining whether the fingerprint output represents that the fingerprint sensor has been touched by the finger comprises determining whether the temperature output is greater than a defined average operating temperature of the CMOS substrate.

In yet another embodiment, the determining whether the temperature output is greater than the defined average operating temperature of the CMOS substrate comprises determining an operating temperature of the CMOS substrate, without contact by the finger, over a defined period of time, e.g., during a non-sensing period of operation of the fingerprint sensor.

In an embodiment, the operations further comprise determining, by the system, the fingerprint output via reflected ultrasonic signals corresponding to the array of PMUTs.

In one embodiment, the determining of the fingerprint output comprises modifying a fingerprint detection component, e.g., a gain of a receive circuit, a phase of the receive circuit, etc. based on the temperature output, and detecting, via the detection component, the reflected ultrasonic signals.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

Conventional fingerprint technologies have had some drawbacks with respect to susceptibility to fraudulent authentication. On the other hand, various embodiments disclosed herein can improve fingerprint detection accuracy by bonding a MEMS based fingerprint sensor to a CMOS based IR sensor to facilitate a determination, based on a temperature output of the IR sensor, of whether the fingerprint sensor is sensing a finger.

Figure 2:
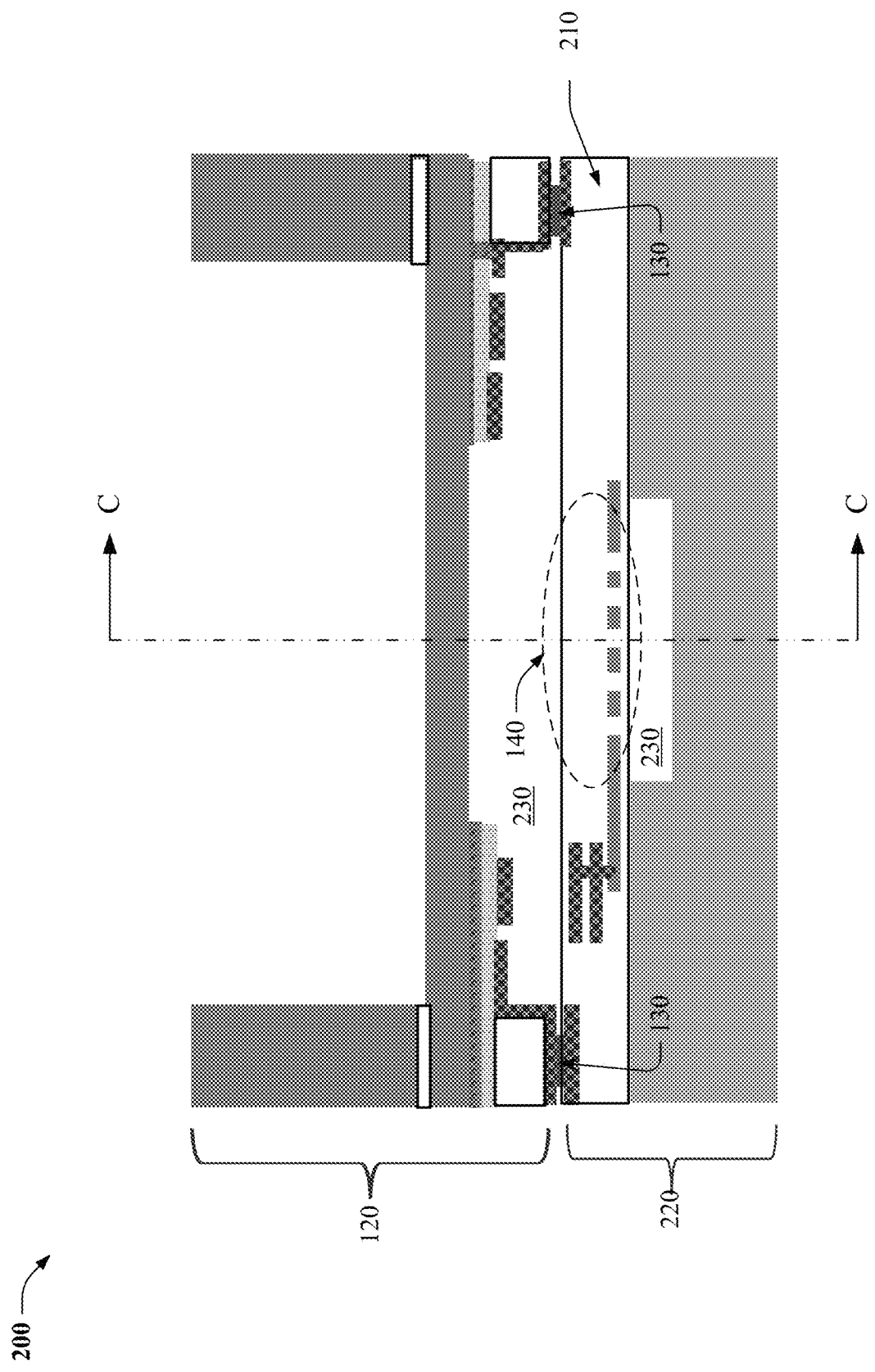
FIG. 2 illustrates a side view of a fingerprint sensor utilizing an integrated ultrasound and IR sensor, in accordance with various example embodiments.
Figure 3:
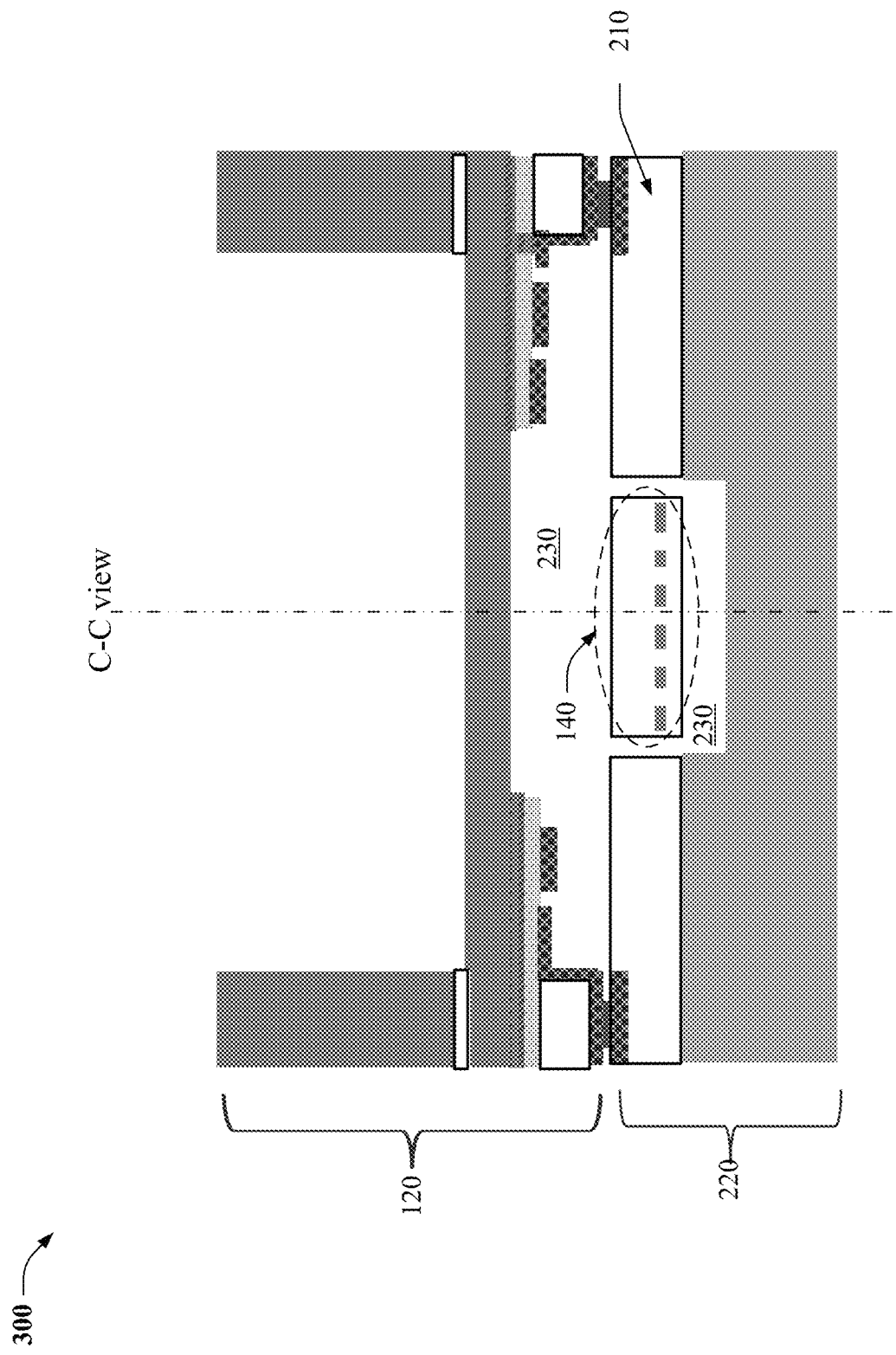
FIG. 3 illustrates a cross-sectional view of a fingerprint sensor utilizing an integrated ultrasound and IR sensor, in accordance with various example embodiments.
Figure 4:
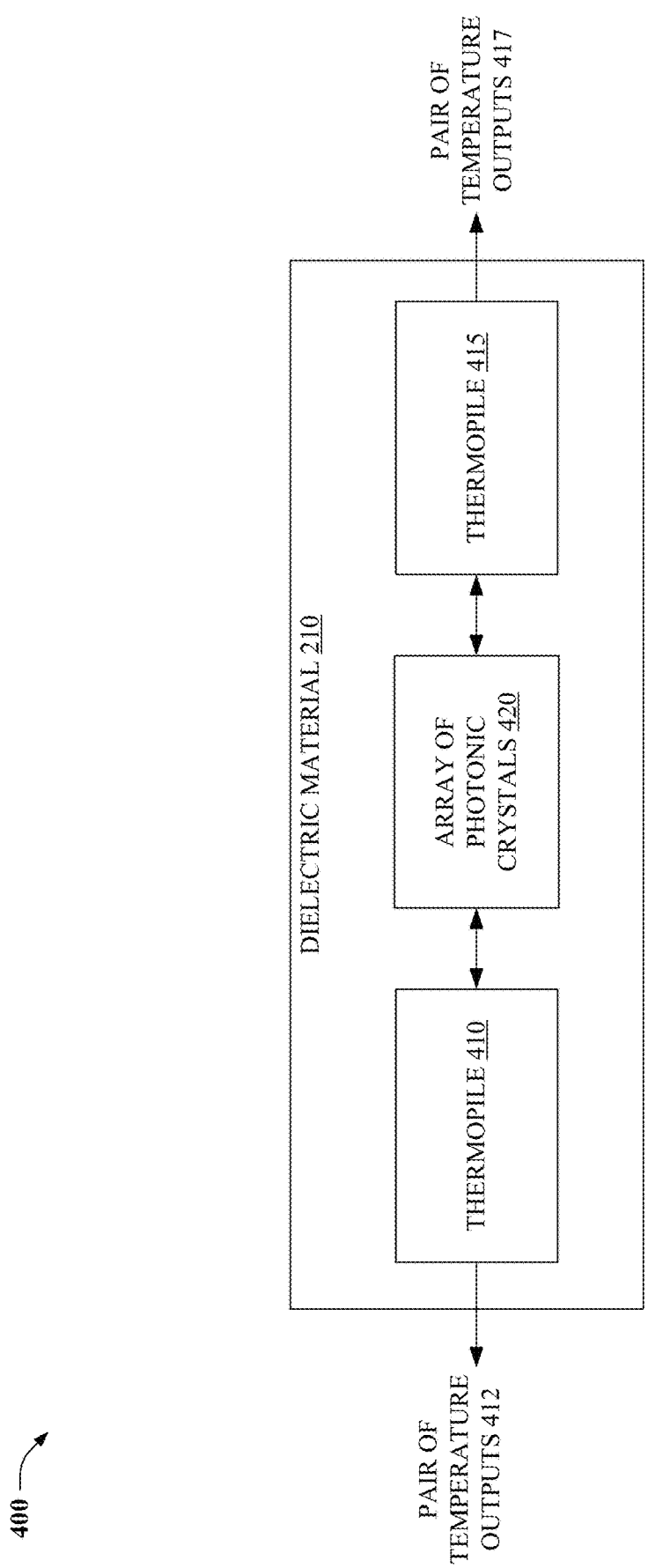
FIG. 4 illustrates a block diagram of a dielectric material of a complementary metal-oxide-semiconductor (CMOS) substrate—the dielectric material comprising thermopiles and an array of photonic crystals thermally coupled to the thermopiles, in accordance with various example embodiments.
Figure 5:
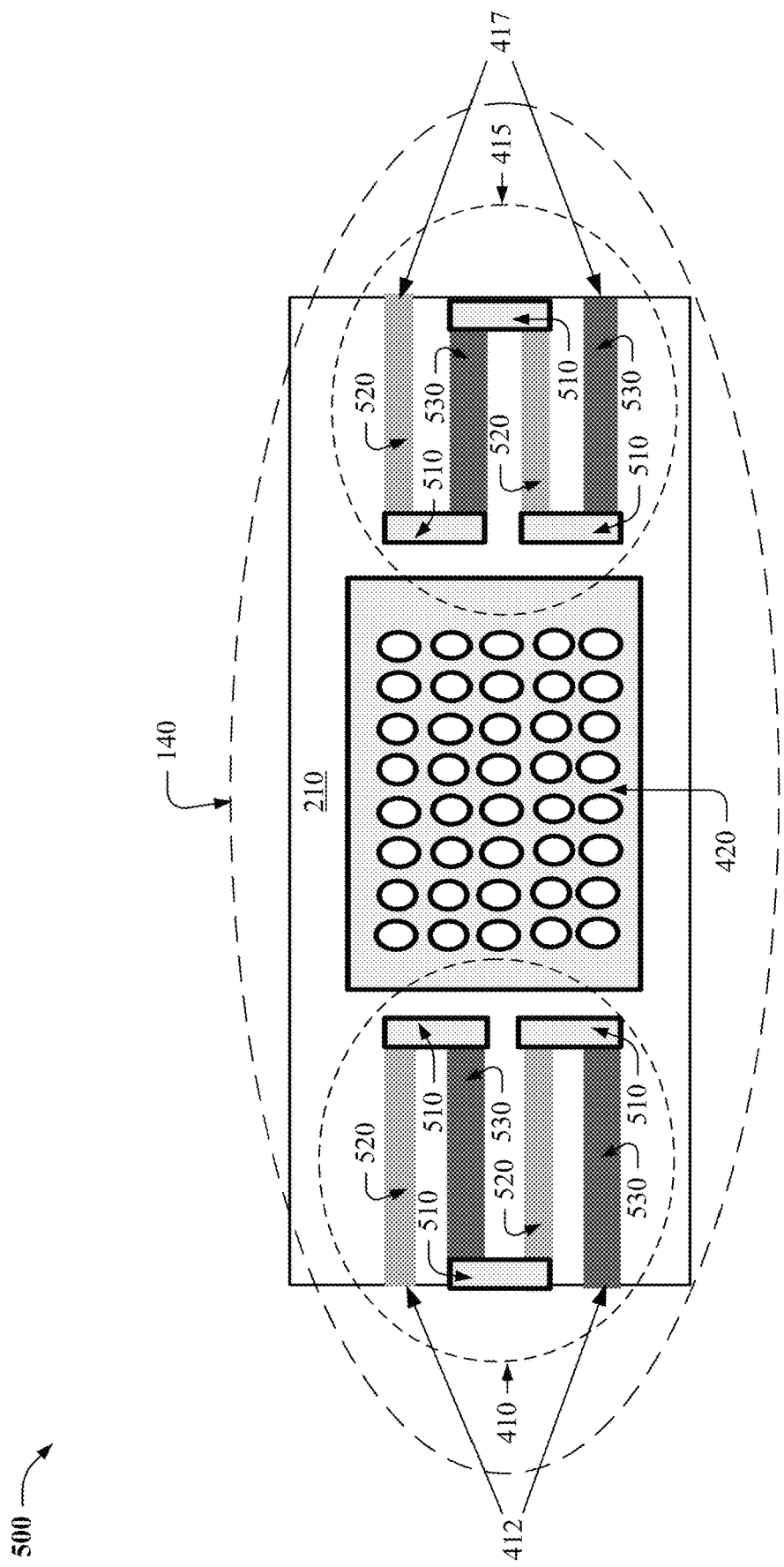
FIG. 5 illustrates a top view of a dielectric material of a CMOS substrate comprising thermopiles and an array of photonic crystals thermally coupled to the thermopiles, in accordance with various example embodiments.

In this regard, and now referring to FIGS. 1 and 2, fingerprint sensor 110 can comprise a MEMS substrate comprising PMUT transducers 120. The MEMS substrate is attached, via bonds 130, to dielectric material 210 of a top portion of CMOS substrate 220. In this regard, bonds 130 can comprise aluminum (Al) on a surface of dielectric material 210 and germanium (Ge) on a surface of the MEMS substrate.

In embodiment(s), fingerprint sensor 110, PMUT transducers 120, etc. can comprise acoustic sensing elements, e.g., piezoelectric elements, which can generate and sense ultrasonic sound waves. In this regard, an object, e.g., a finger, in a path of a generated sound wave can create a disturbance, e.g., a change in frequency, a change in phase, a reflection, an echo, etc. of a signal that can be sensed. Interference corresponding to such disturbance can be analyzed to determine physical parameters such as, but not limited to, a distance of the object from the fingerprint sensor, a density of the object, a speed of the object, etc. For example, a difference in respective magnitudes of reflected signals corresponding to a ridge area of a finger and a valley area of the finger form the basis of creating a fingerprint image. In this regard, a reflected signal corresponding to the valley area of the finger is much higher in magnitude than a reflected signal corresponding to the ridge area of the finger, e.g., due to greater acoustic impedance mismatch at a surface of PMUT transducers 120.

In one embodiment, PMUT transducers 120 can be part of a sensor array comprising a plurality of ultrasonic transducers deposited on a wafer, along with various logic, control and communication electronics. In another embodiment, the sensor array can comprise homogenous or identical transducers, ultrasonic transducers, etc., or a number of different or heterogonous transducers, ultrasonic transducers, device structures, etc., e.g., comprising an array of capacitive micromachined ultrasonic transducers (CMUT) devices, etc.

In yet another embodiment, portion(s) of PMUT transducers 120 can be activated, e.g., utilizing fingerprint signals, during a transmit phase in which an acoustic signal is generated, e.g., during an active operational mode for fingerprint recognition. Further, reflected signal(s), echo(s), etc. can then be received, e.g., utilizing the fingerprint signals, during a receive phase. As described above, a difference in respective magnitudes of the reflected signal(s) corresponding to a ridge area of a finger and a valley area of the finger form the basis of creating a fingerprint image. In an embodiment, CMOS substrate 220 can comprise at least one drive circuit (not shown), for driving transmission of the respective acoustic signals from ultrasonic transducers of the PMUT devices. Further, CMOS substrate 220 can comprise at least one receive circuit (not shown) for receiving reflected signals, e.g., the interference signal(s), from the PMUT devices.

PMUT transducers 120 can comprise a two-dimensional array of ultrasonic transducers, e.g., as described by patent application Ser. No. 15/424,720, filed Feb. 3, 2017, and entitled "A SENSING DEVICE WITH A TEMPERATURE SENSOR", the disclosure of which is hereby incorporated by reference in its entirety herein.

For example, in embodiment(s), PMUT transducers 120 can comprise, e.g., PMUT device 100, a two-dimensional array 700 of circular-shaped PMUT devices 701, a two-dimensional array 800 of square-shaped PMUT devices 801, a two-dimensional array 900 of hexagon-shaped PMUT devices 901, a pair of PMUT devices 1000 in a PMUT array, a PMUT device array 1200, a sensing device 1430, an array of ultrasonic transducers 1450, a transmit path architecture 1500 of a two-dimensional array of ultrasonic transducers, a receive path architecture 1600 of a two-dimensional array of ultrasonic transducers, etc. as described by the aforementioned patent application.

In other embodiment(s), fingerprint signals corresponding to PMUT transducers 120, e.g., corresponding to array of ultrasonic transducers 1450, can be exchanged between PMUT transducers 120 and, e.g., system circuitry 1440, control module 1460, memory 1470, external interface 1485, external device 1490, etc. as described by the aforementioned patent application.

In yet other embodiment(s), the fingerprint signals can correspond to $sel_{ph\_map}$ signals of transmit path architecture 1500, select lines (e.g., 1610, 1620) of receive path architecture 1600, etc. as described by the aforementioned patent application.

Referring now to FIGS. 2-5, dielectric material 210 can comprise IR sensor 140, which can facilitate a determination, based on a temperature output of IR sensor 140, that the fingerprint signals, e.g., representing a fingerprint image, correspond to a real finger that has been touching, contacting, etc. fingerprint sensor 110.

IR sensor 140 comprises thermopiles 410 and 415, e.g., included within dielectric material 210. Thermopiles 410 and 415 comprise polysilicon based thermocouples connected in series—each thermocouple comprising first material 520 and second material 530 that are connected to form a junction that can generate a Seebeck effect based voltage. In this regard, in an embodiment illustrated by FIG. 5, first material 520 and second material 530 can be connected via third material 510, e.g., a conductive material, metal, etc. In another embodiment (not shown), first material 520 can be directly connected to material 530 to form such junction, e.g., without third material 510.

In embodiment(s), first material 520 and second material 530 can comprise materials found readily in CMOS process(es), e.g., p-poly, n-poly, metal, etc. In this regard, in one embodiment, first material 520 can comprise a p-type polysilicon gate segment, and second material 530 can comprise an n-type polysilicon gate segment, e.g., with a doping that is opposite in polarity (e.g., within a defined range, e.g., +/−10%) from a doping, e.g., p-type, of first material 520.

For example, in one embodiment, first material 520 can comprise an n-type polysilicon gate segment, e.g., n-poly, while second material 530 can comprise a p-type polysilicon gate segment, e.g., p-poly. In another embodiment, first material 520 can comprise a metal, e.g., Al, and second material 530 can comprise n-poly/p-poly. In yet another embodiment, first material 520 can comprise an n+ diffusion layer, and second material 530 can comprise a p+ diffusion layer. In this regard, and now referring to a cross-sectional view of fingerprint sensor 110 illustrated by FIG. 3, portions of CMOS substrate 220 comprising IR sensor 140 can be isolated, suspended, thermally isolated, etc. from other portions of CMOS substrate 220, e.g., during fabrication, assembly, etc. In one embodiment, IR sensor 140 can be formed, suspended, etc. over, within, etc. a chamber, e g, chamber 230, of CMOS substrate 220. In another embodiment, chamber 230 can comprise a vacuum, e.g., facilitating further thermal isolation between IR sensor 140 and other portions of CMOS substrate 220, PMUT transducers 120, etc.

IR sensor 140 further comprises array of photonic crystals 420, e.g., an array of IR absorbent photonic crystals, which is included within dielectric material 210. In this regard, as described below, array of photonic crystals 420 can be thermally coupled to first material 520 and second material 530 of corresponding thermocouples. In an embodiment, array of photonic crystals 420 comprises a geometric formation of a material, e.g., comprising IR absorbent photonic crystals, to facilitate absorption of desired wavelength(s) of radiation, e.g., to enhance detection of incoming IR thermal radiation, e.g., corresponding to a finger being applied to fingerprint sensor 110.

First material 520 and second material 530 can be thermally coupled to array of photonic crystals 420, and generate, via pair of temperature outputs 412 of thermopile 410 and pair of temperature outputs 417 of thermopile 415, respective voltages based on thermal energy—such voltages representing a temperature of IR sensor 140. As described below, a processing device, system, etc., e.g., processing component 610, can determine, based on the temperature, whether the finger input represents that a real finger has been touching, contacting, etc. fingerprint sensor 110.

Figure 6:
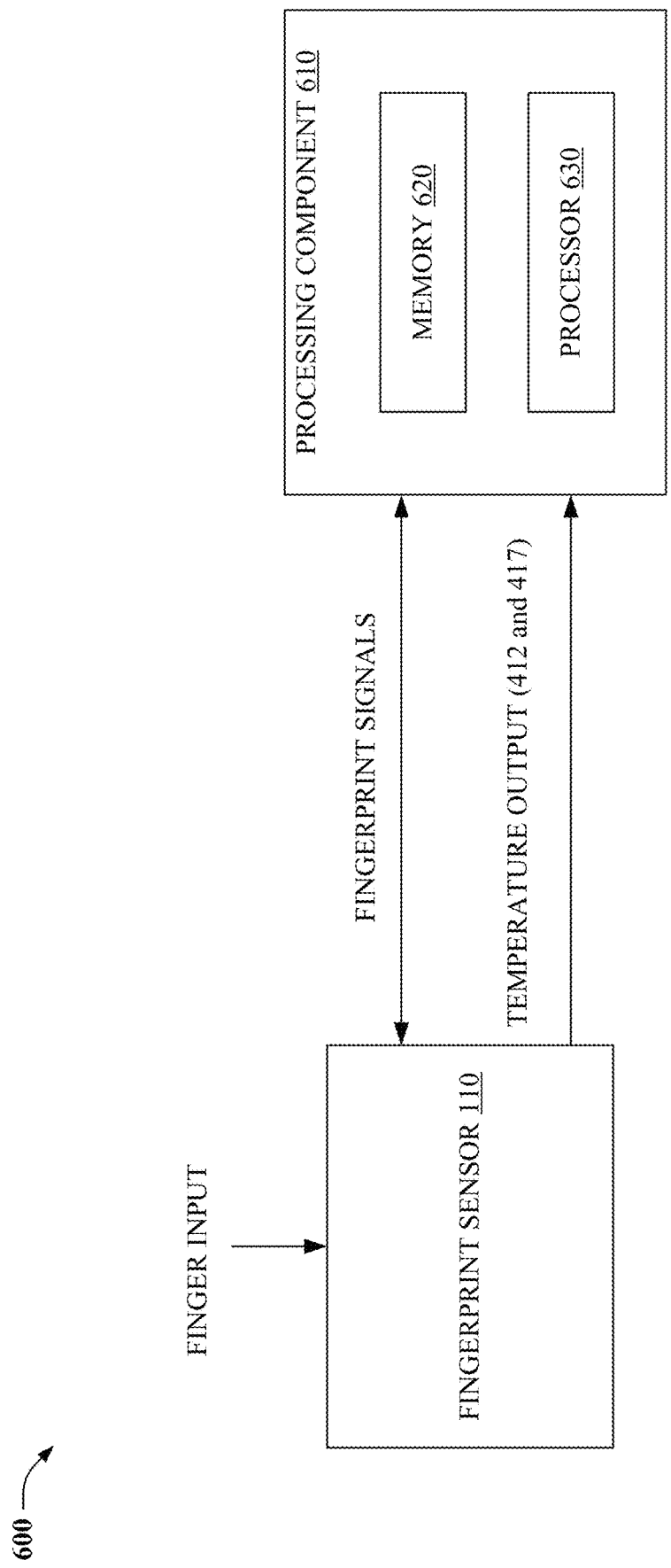
FIG. 6 illustrates a block diagram of a fingerprint sensing system, in accordance with various example embodiments.

Referring now to FIG. 6, a block diagram of a fingerprint sensing system (600) is illustrated, in accordance with various example embodiments. Fingerprint sensing system 600 can comprise fingerprint sensor 110 communicatively coupled to processing component 610. In this regard, fingerprint sensing system 600, fingerprint sensor 110, etc. can be utilized in various applications, such as, but not limited to, fingerprint or physiologic sensors suitable for wireless devices, industrial systems, automotive systems, robotics, telecommunications, security, medical devices, etc.

In embodiment(s), fingerprint sensing system 600, fingerprint sensor 110, etc. can be used for analysis of acoustically sensed data in various applications, such as, but not limited to, medical applications, security systems, biometric systems (e.g., comprising fingerprint sensors and/or motion/gesture recognition sensors), mobile communication systems, industrial automation systems, consumer electronic devices, robotic/automated devices, etc. For example, processing component 610, fingerprint sensor 110, etc. can be included in a mobile device, mobile phone, user equipment, etc.

In one embodiment, processing component 610 can generate, sense, etc. ultrasonic signals, e.g., fingerprint signals, for determining a fingerprint, fingerprint image, etc. Further, processing component 610 can determine, based on a temperature output, e.g., pair of temperature outputs 412, pair of temperature outputs 417, etc. of fingerprint sensor 110, whether the fingerprint, fingerprint image, etc. corresponds to a real finger being applied to fingerprint sensor 110.

In this regard, processing component 610 can determine, e.g., via memory 620 and processor 630, whether the temperature output is greater than a defined average operating temperature of the CMOS substrate, fingerprint sensor 110, etc. For example, in an embodiment, processing component 610 can determine an operating temperature of the CMOS substrate without fingerprint sensor 110 being contacted by a finger over a defined period of time, sampling period, etc. Further, based on a determined average of the operating temperature, e.g., over a defined number of samples of the operating temperature, processing component 610 can determine that the fingerprint, fingerprint image, etc. corresponds to the real finger touching, contacting, etc. fingerprint sensor 110, e.g., in response to detecting that the temperature output is greater than the defined average operating temperature, in response to detecting that the temperature output is greater than a product of the defined average operating temperature and a defined multiple, multiplier, etc. of the defined average operating temperature, etc.

In one embodiment, processing component 610 can modify a fingerprint detection component (not shown), e.g., a gain of a receive circuit (not shown) of the fingerprint detection component, a phase of the receive circuit, etc. based on the temperature output. In another embodiment, based on the temperature output, processing component 610 can account for changes in an expected ultrasonic travel time, modify a timing of acoustic signals generated by the detection component, e.g., modify a gain of a driver circuit (not shown) of the fingerprint detection component, a phase of the driver circuit, etc. In yet another embodiment, processing component 610 can modify a receive window for receiving ultrasonic signals, e.g., reflected signals from fingerprint sensor 110, based on the temperature output.

In an embodiment, processing component 610 can be included in CMOS substrate 220, another substrate that has been attached, communicatively coupled, etc. to CMOS substrate 220, etc.

In one embodiment, fingerprint sensing system 600 can include a platen, e.g., platen 1216 as described by the aforementioned patent application. In this regard, fingerprint sensing system 600 can comprise a touch-screen display device (not shown) comprising the platen. In an embodiment, fingerprint sensor 110 can be disposed beneath, adjacent to, close to, etc. the touch-screen display device.

A human finger can make contact with the platen, and processing component 610 can, via fingerprint sensor 110, generate and receive ultrasonic signals coupled to the platen. Further, processing component 610 can perform, via fingerprint sensor 110, various operations, e.g., performed by processing logic module 140 as described by the aforementioned patent application, e.g., determine an image depicting epidermis and/or dermis layers of a finger.

In this regard, in response to determining, based on the temperature output, that the platen has been contacted, touched, etc. by a real finger, processing component 610 can further compare the image with a set of known fingerprint images to facilitate an identification and/or an authentication of a user identity. In one embodiment, in response to determining that the image satisfies a defined condition with respect to a fingerprint image of the set of known fingerprint images, e.g., in response to determining that the image matches the fingerprint image, processing component can authenticate the user identity, and enable a feature, an application, an operation, etc. of a corresponding device based on such authentication.

FIGS. 7-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification corresponding to system 600 are capable of being stored on an article of manufacture to facilitate transporting and transferring such methodologies to devices, computing devices, computers, etc. The term article of manufacture, as used herein, is intended to encompass a computer program accessible from any computer-readable device, carrier, or media.

Figure 7:
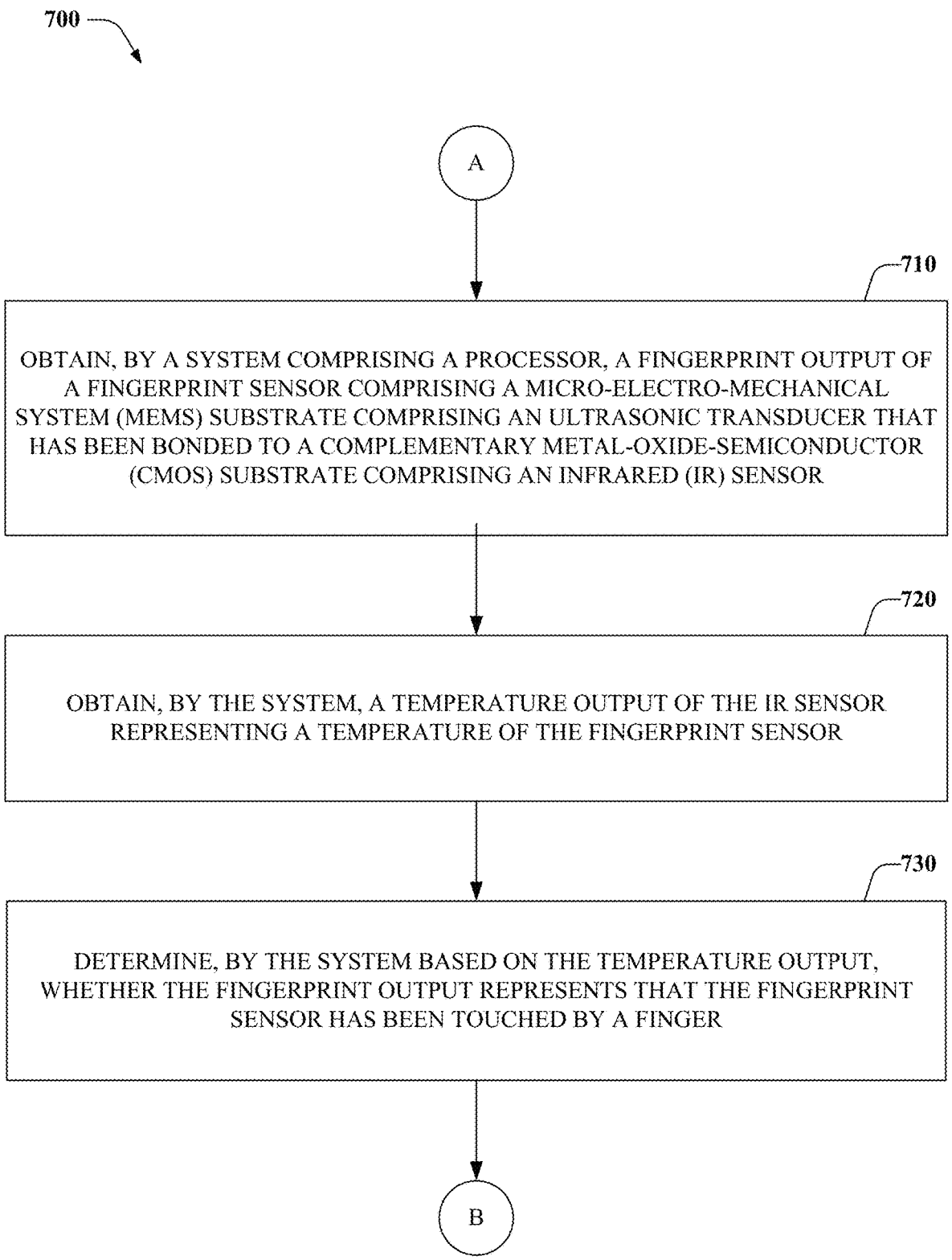
FIGS. 7-8 illustrate flowcharts of methods associated with a fingerprint sensing system, in accordance with various example embodiments.
Figure 8:
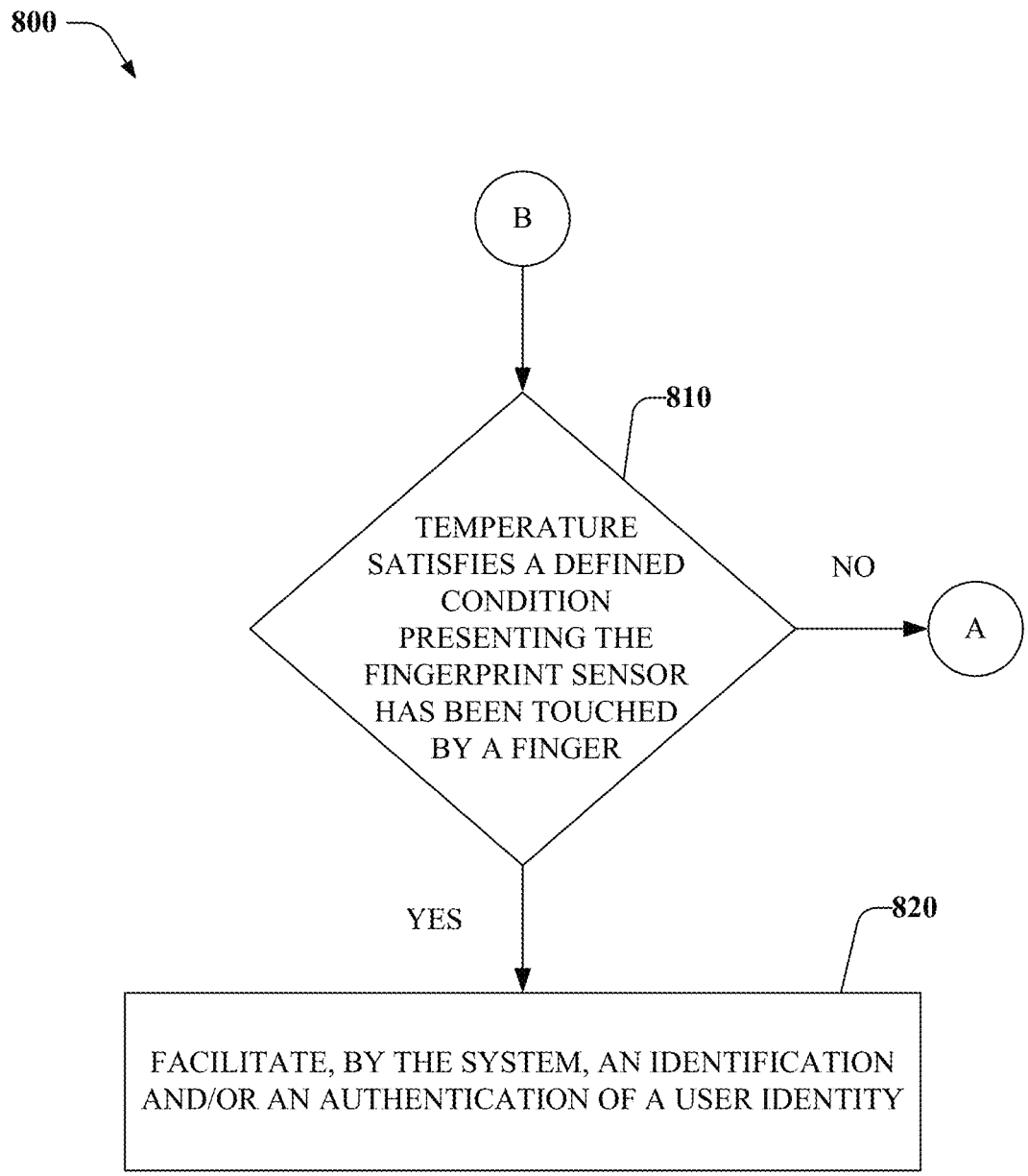

Referring now to FIGS. 7-8, processes 700 to 800 performed by fingerprint sensing system 600 are illustrated, in accordance with various example embodiments. At 710, a fingerprint output of a fingerprint sensor can be obtained—the fingerprint sensor comprising a MEMS substrate comprising an ultrasonic transducer that has been bonded, e.g., via fusion bonds, eutectic bonds, etc. to a CMOS substrate comprising an IR sensor. At 720, a temperature output of the IR sensor representing a temperature of the fingerprint sensor can be obtained. At 730, it can be determined, based on the temperature output, whether the fingerprint output represents that the fingerprint sensor has been touched by a finger.

At 810, if it is determined that the temperature satisfies a defined condition representing the fingerprint sensor has been touched by a finger, e.g., that the temperature is greater than an average operating temperature of the fingerprint sensor, flow continues to 820, at which an identification and/or an authentication of a user identity can be facilitated, performed, etc.; otherwise flow returns to 710. For example, in an embodiment, performance of the identification and/or the authentication of the user identity can comprise determining whether the fingerprint output, image, etc. satisfies a defined condition with respect to a known fingerprint, e.g., that the image matches the known fingerprint. In this regard, if it is determined that the fingerprint output satisfies the defined condition with respect to the known fingerprint, the user identity can be authenticated, authorized, etc. For example, a feature, an application, an operation, etc. of a corresponding device can be enabled based on the user identity being authenticated, authorized, etc.

Figure 9:
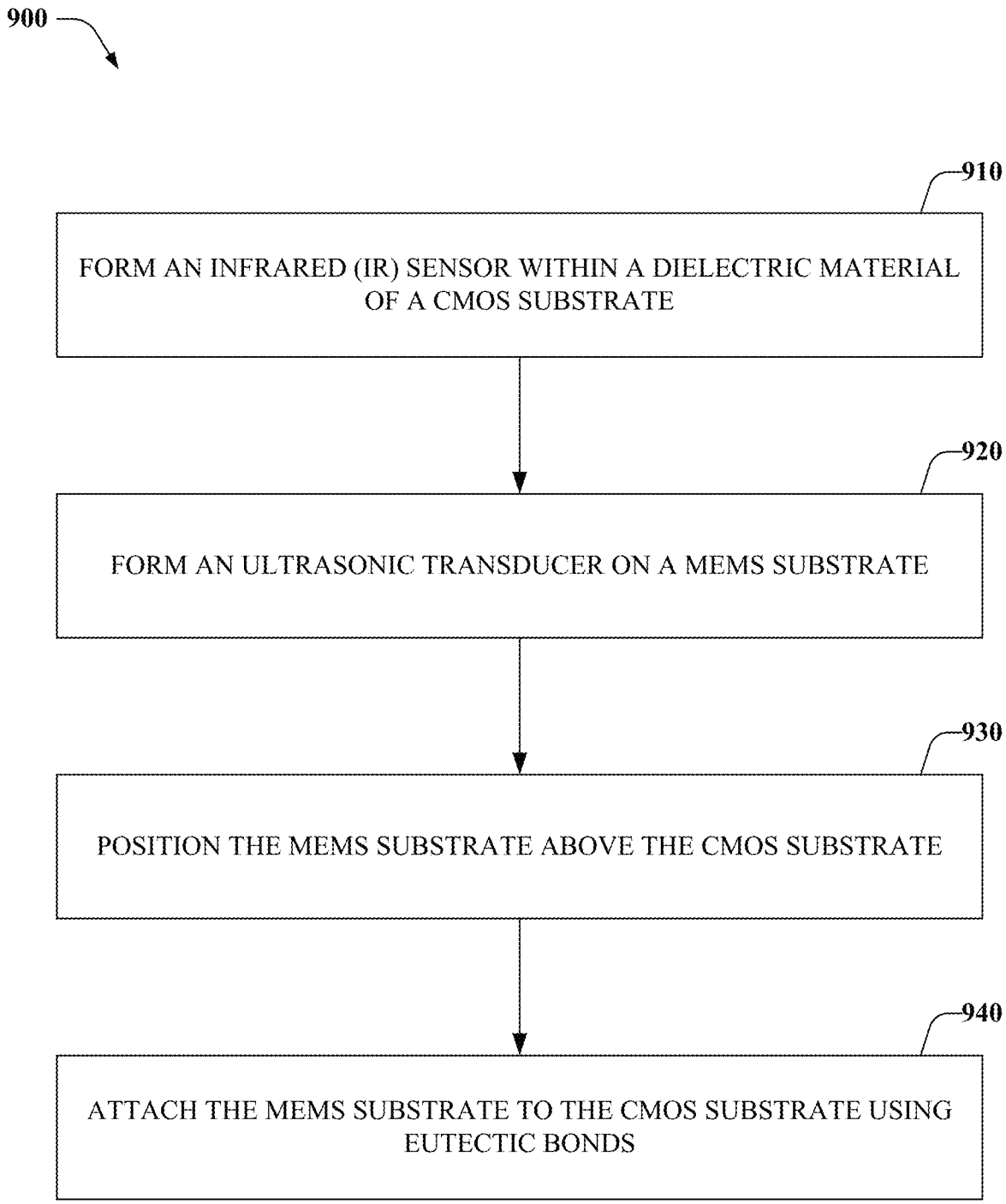
FIGS. 9-10 illustrate methods of manufacture of a fingerprint sensor, in accordance with various example embodiments.
Figure 10:
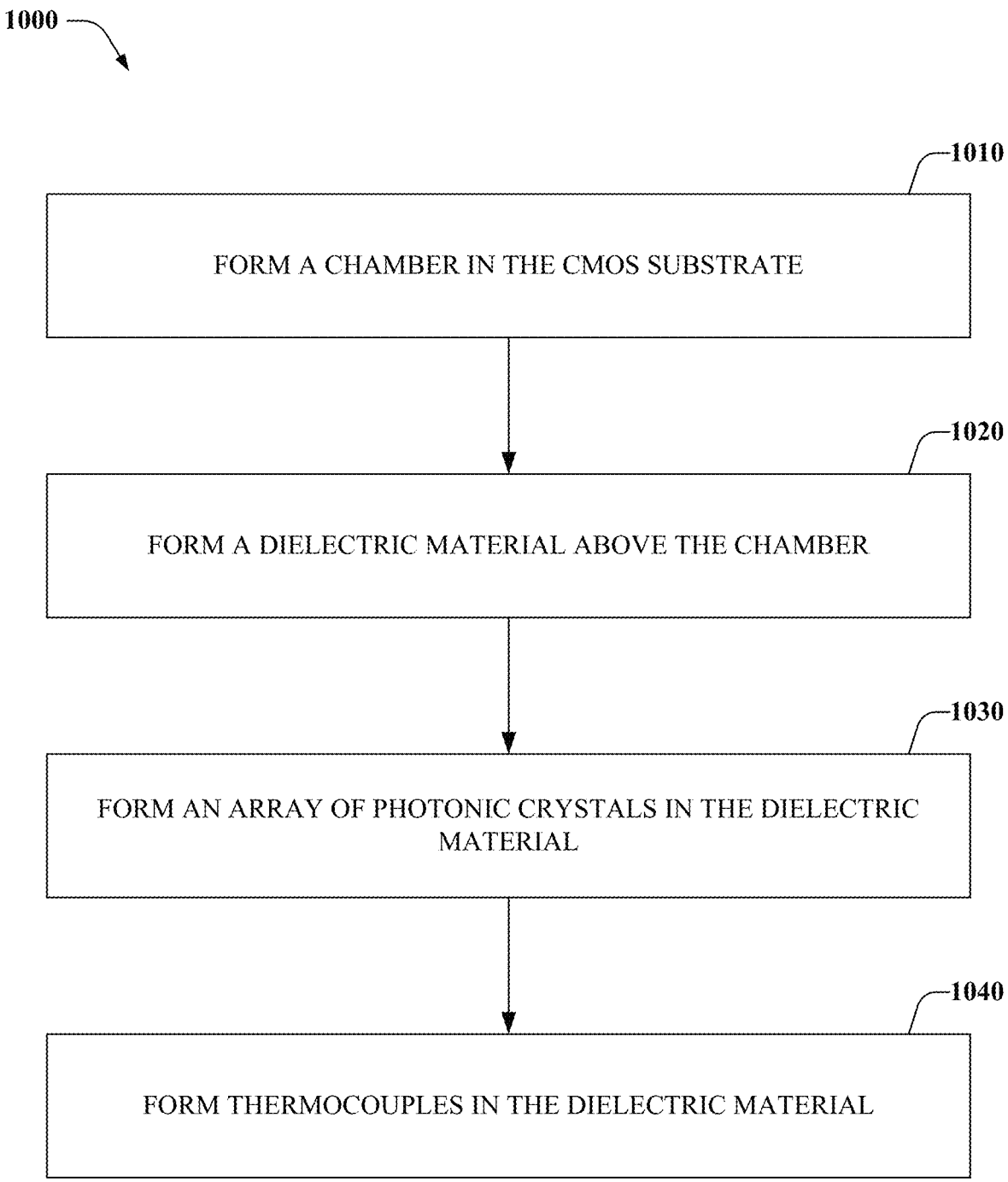

FIG. 9-10 illustrate methods of manufacture of a fingerprint sensor, in accordance with various example embodiments. At 910, an IR sensor can be formed within a dielectric material of a CMOS substrate. In an embodiment, the IR sensor can be formed by forming thermocouples and an array of photonic crystals within the dielectric material. In another embodiment, a thermocouple of the thermocouples can be formed by forming a first output via a p-type polysilicon gate layer, and forming a second output via an n-type polysilicon gate layer.

At 920, an ultrasonic transducer, an array of ultrasonic transducers, etc. can be formed on a MEMS substrate. At 930, the MEMS substrate can be positioned above the CMOS substrate. At 940, the MEMS substrate can be attached to the CMOS substrate using eutectic bonds.

In an embodiment illustrated by FIG. 10, a chamber can be formed in the CMOS substrate at 1010. At 1020, a dielectric material can be formed above the chamber. At 1030, an array of photonic crystals can be formed within the dielectric material. At 1040, thermocouples can be formed in the dielectric material.

As it employed in the subject specification, the terms "processor", "processing component", etc. can refer to substantially any computing processing unit or device, e.g., processing component 610, processor 630, etc., comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, terms such as "memory" and substantially any other information storage component relevant to operation and functionality of fingerprint sensors and/or devices disclosed herein, e.g., memory 620, etc. refer to "memory components," or entities embodied in a "memory," or components comprising the memory. It will be appreciated that the memory can include volatile memory and/or nonvolatile memory.

By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the fingerprint sensors and/or devices disclosed herein can comprise, without being limited to comprising, these and any other suitable types of memory.

Aspects of fingerprint sensors, apparatus, devices, processes, and process blocks explained herein can be embodied within hardware, such as an application ASIC or the like. In other embodiment(s), such aspects can constitute machine-executable instructions embodied within a machine, e.g., embodied in a computer readable medium (or media) associated with the machine. Such instructions, when executed by the machine, can cause the machine to perform the operations, process blocks, etc. described. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
 a complementary metal-oxide-semiconductor (CMOS) substrate comprising a dielectric material, wherein a portion of the dielectric material that has been separated from other portions of the dielectric material comprises an infrared (IR) sensor comprising an array of photonic crystals and polysilicon-based thermopiles that are thermally coupled to the array of photonic crystals within the portion of the dielectric material;
 a transducer substrate that comprises an ultrasonic transducer and is attached to a top portion of the CMOS substrate; and
 a fingerprint detection component that
  determines a temperature of the device representing whether the device has been touched by a finger, and
  modifies, based on changes in a speed of sound due to the temperature, a gain of a driver circuit of the fingerprint detection component and a phase of the driver circuit to account for the changes in the speed of sound that has been represented by the changes in expected ultrasonic travel times of respective reflected ultrasonic signals that have been received by the fingerprint detection component.

2. The device of claim 1, wherein the IR sensor comprises a polysilicon-based thermocouple.

3. The device of claim 2, wherein the polysilicon-based thermocouple comprises a p-type polysilicon gate material in conjunction with an n-type polysilicon gate material.

4. The device of claim 3, wherein the array of photonic crystals is thermally coupled to the p-type polysilicon gate material and the n-type polysilicon gate material.

5. The device of claim 3, wherein a thermopile of the polysilicon-based thermopiles comprises polysilicon-based thermocouples comprising the polysilicon-based thermocouple.

6. The device of claim 5, wherein the thermopile is formed above a chamber of the CMOS substrate.

7. The device of claim 6, wherein a top portion of the IR sensor is opposite the chamber, wherein a bottom portion of the IR sensor is adjacent to the chamber, and wherein the top portion and the bottom portion comprise a vacuum.

8. The device of claim 1, wherein the transducer substrate comprises a micro-electro-mechanical system (MEMS) device.

9. The device of claim 1, wherein the transducer substrate is attached to the top portion of the CMOS substrate using eutectic bonds.

10. The device of claim 1, wherein the ultrasonic transducer comprises a piezoelectric micromachined ultrasonic transducer.

11. A method, comprising:
 forming an infrared (IR) sensor in a portion of a dielectric material of a complementary metal-oxide-semiconductor (CMOS) substrate, wherein the portion has been separated from other portions of the dielectric material, and wherein the IR sensor comprises an array of photonic crystals and polysilicon-based thermopiles that are thermally coupled to the array of photonic crystals within the portion of the dielectric material;
 forming an ultrasonic transducer on a micro-electro-mechanical system (MEMS) substrate, wherein a gain of a driver circuit of the ultrasonic transducer and a phase of the driver circuit is modified, based on changes in a speed of a reflected ultrasonic signal due to a temperature of the IR sensor, during operation of the ultrasonic transducer to account for changes in an expected ultrasonic travel time of the reflected ultrasonic signal;
 positioning the MEMS substrate above the CMOS substrate; and
 attaching the MEMS substrate to the CMOS substrate using eutectic bonds.

12. The method of claim 11, wherein the forming of the IR sensor comprises:
 forming a thermocouple in the dielectric material of the CMOS substrate.

13. The method of claim 12, wherein the forming of the thermocouple comprises:
 forming the thermocouple from polysilicon.

14. The method of claim 13, wherein the forming of the thermocouple from polysilicon comprises:
 forming a first output of the thermocouple via a p-type polysilicon gate material; and
 forming a second output of the thermocouple via an n-type polysilicon gate material.

15. The method of claim 12, wherein the forming of the thermocouple comprises:
 forming the thermocouple above a vacant chamber of the CMOS substrate.

16. The method of claim 15, further comprising:
 creating a vacuum in the vacant chamber.

17. The method of claim 12, further comprising:
 forming the array of photonic crystals in the dielectric material of the CMOS substrate.

18. A system, comprising:
 a fingerprint sensor comprising
  an infrared (IR) sensor that has been formed in a first portion of a dielectric material of a complementary metal-oxide-semiconductor (CMOS) substrate, and
  an ultrasonic transducer of a micro-electro-mechanical system (MEMS) substrate, wherein the MEMS substrate is attached above the CMOS substrate using fusion bonds, and wherein the first portion of the dielectric material has been separated from a second portion of the dielectric material and comprises an array of photonic crystals and poly silicon-based thermopiles that are thermally coupled to the array of photonic crystals within the first portion of the dielectric material; and
 a processing component configured to
  determine, based on a temperature of the IR sensor, whether the ultrasonic transducer has been contacted by a finger, and
  modify, based on changes in a speed of sound due to the temperature, a gain of a driver circuit of the ultrasonic transducer and a phase of the driver circuit to account for changes in respective expected ultrasonic travel times of reflective ultrasonic signals that have been received by the ultrasonic transducer.

19. The system of claim 18, wherein the polysilicon-based thermopiles comprise thermocouples.

20. The system of claim 19, wherein a thermocouple of the thermocouples comprises a first portion of polysilicon comprising a p-type gate polysilicon layer and a second portion of the polysilicon comprising an n-type gate polysilicon layer.

21. The system of claim 18, wherein the polysilicon-based thermopiles are placed above a chamber of the CMOS substrate.

22. The system of claim 21, wherein the chamber comprises a vacuum.

23. A method, comprising:
obtaining, by a system comprising a processor, a fingerprint output of a fingerprint sensor, wherein the fingerprint sensor comprises a micro-electro-mechanical system (MEMS) substrate comprising an ultrasonic transducer that has been bonded to a complementary metal-oxide-semiconductor (CMOS) substrate comprising a first portion of dielectric material and a second portion of dielectric material, wherein the first portion of dielectric material comprises an infrared (IR) sensor comprising an array of photonic crystals and polysilicon-based thermopiles that are thermally coupled to the array of photonic crystals, and wherein the first portion of dielectric material has been separated from a second portion of dielectric material within the CMOS substrate;
obtaining, by the system, a temperature output of the IR sensor representing a temperature of the fingerprint sensor;
determining, by the system based on the temperature output, whether the fingerprint output represents that the fingerprint sensor has been touched by a finger; and
based on changes in a speed of sound due to the temperature, modifying a gain of a circuit of the ultrasonic transducer and a phase of the circuit to account for changes in an expected ultrasonic travel time of reflected ultrasonic signals that have been received by the ultrasonic transducer.

24. The method of claim 23, wherein the polysilicon-based thermopiles comprise thermocouples, wherein a first output of a thermocouple of the thermocouples corresponds to a p-type polysilicon gate material, wherein a second output of the thermocouple corresponds to an n-type polysilicon gate material, wherein the array of photonic crystals is electronically coupled to the p-type polysilicon gate material and the n-type polysilicon gate material, and wherein the obtaining the temperature output comprises obtaining the temperature output via the first output and the second output.

25. The method of claim 24, wherein the determining comprises:
determining whether the temperature output is greater than a defined average operating temperature of the CMOS substrate.

26. The method of claim 25, wherein the determining whether the temperature output is greater than the defined average operating temperature of the CMOS substrate comprises determining an operating temperature of the CMOS substrate, without contact by the finger, over a defined period of time.

27. The method of claim 23, wherein the ultrasonic transducer comprises an array of piezoelectric micromachined ultrasonic transducers, wherein the reflected ultrasonic signals correspond to the array of piezoelectric micromachined ultrasonic transducers, and wherein the operations further comprise:
determining, by the system, the fingerprint output via the reflected ultrasonic signals.

28. The method of claim 27, wherein the determining the fingerprint output comprises:
detecting the reflected ultrasonic signals.

* * * * *